United States Patent [19]

Hasegawa et al.

[11] 4,323,775
[45] Apr. 6, 1982

[54] DIVIDED EXPOSURE METHOD AND DEVICE

[75] Inventors: Takanori Hasegawa, Hachioji; Takanobu Shimada, Machida; Takao Sato, Tokyo; Masakazu Kera, Yokohama; Shuntaro Yoshida, Tokyo; Shinichi Shimoyama, Sendai, all of Japan

[73] Assignee: Riso Kagaku Corporation, Tokyo, Japan

[21] Appl. No.: 158,773

[22] Filed: Jun. 12, 1980

[30] Foreign Application Priority Data

Jul. 30, 1979 [JP] Japan .................................. 54-97944

[51] Int. Cl.³ .............................................. G03C 5/16
[52] U.S. Cl. .................................. 250/317.1; 250/318; 250/319
[58] Field of Search .................... 250/316, 317.1, 318, 250/319

[56] References Cited

U.S. PATENT DOCUMENTS

| | | | |
|---|---|---|---|
| 3,038,994 | 6/1962 | Nelson et al. | 250/319 |
| 3,501,635 | 3/1970 | Sprunger et al. | 250/319 |
| 3,904,875 | 9/1975 | Rees et al. | 250/318 |
| 4,210,396 | 7/1980 | Müller | 250/317.1 |

*Primary Examiner*—Bruce C. Anderson

*Attorney, Agent, or Firm*—Birch, Stewart, Kolasch & Birch

[57] ABSTRACT

A method for exposing a sheet to light radiation while it is under pressure, in which successive portions of the sheet which slightly overlap one another are sequentially clamped between a pressure plate and a light transmitting plate, and are irradiated with electromagnetic radiation through the light transmitting plate in the clamped condition. Further, a device for practicing the method is disclosed, which includes: a light source; a light transmitting plate arranged with the light source on one of its sides; a pressure plate which opposes the other side of the light transmitting plate; a member for relatively biasing the light transmitting plate or the pressure plate towards and away from each other; a device for transporting the sheet passing between the light transmitting plate and the pressure plate; and a control for controlling the light source, the biasing member, and the transporting device, which causes the light source to emit light when the pressure plate and the light transmitting plate are pressed against each other with the sheet between them, and which causes the transporting device to transport the sheet through a distance less than the width of the light transmitting plate, when the light transmitting plate and the pressure plate are separated by more than a certain predetermined distance.

10 Claims, 3 Drawing Figures

DIVIDED EXPOSURE METHOD AND DEVICE

BACKGROUND OF THE INVENTION

The present invention relates to a method and a device for exposing a sheet to electromagnetic radiation.

There is a well known method of performing thermographic duplication, in which a heat sensitive sheet, which is affected by heat and which is substantially transparent, is superposed over an original bearing a pattern to be copied which is formed of an infrared radiation absorptive material, and electromagnetic radiation, preferably electromagnetic radiation which contains a high proportion of infrared radiation, is radiated onto this superposition of the heat sensitive sheet over the original. This electromagnetic radiation penetrates through the substantially transparent heat sensitive sheet onto the original, and those parts of the heat sensitive sheet which are resting against the patterns of the original are heated by heat which is generated in these patterns by absorption of infrared rays from the electromagnetic radiation. Therefore, the parts of the heat sensitive sheet are changed, for instance by change of color, perforation or shrinkage. Thus, the heat sensitive sheet picks up an image thereon which is a copy of the pattern on the original sheet.

For this kind of thermographic copying, it is very important for the heat sensitive sheet to be uniformly pressed against the original, in order that the heat generated in the original pattern by the electromagnetic radiation is effectively transferred to the corresponding portions of the heat sensitive sheet. For this pressing, strong pressure needs to be applied to the superposed heat sensitive sheet and the original bearing the pattern to be copied, during the process of irradiation thereof by electromagnetic radiation. More particularly, in such a copying process, there needs to be applied a certain minimum pressing force per unit area of the superposition of the heat sensitive sheet and the original, for satisfactory copying.

Thus, if the original is fairly small, the provision of this pressing force per unit area is not a great problem. However, for an original which is rather large in size, the provision of thus fairly substantial pressing force per unit area, smoothly and uniformly over the entire surface of the superposition of the heat sensitive sheet and the original, becomes very difficult, because the total force to be applied becomes very high. For example, a typical value of pressure which is required between the heat sensitive sheet and the original is of the order of 200 g to 300 g per square centimeter, and, for a B4 size original, the total pressing force which neds to be applied is therefore of the order of 200 Kg to 300 Kg, which is a very high force. Of course, as the size of the original further increases, the difficulty of applying the total required pressing force between the heat sensitive sheet and the original proportionally increases.

Another problem which occurs, when the size of the original is increased with conventional thermographic devices utilizing the process outlined above, is that there is a certain optimum amount of heat energy per unit area of the original that should be available for transfer to patterns of the original. That is to say, in the case of using a flash discharge tube such as a xenon lamp as the source of the irradiating electromagnetic radiation, so as to carry out the thermography operation instantaneously by a flash light, if the original is quite small in size, one xenon flash discharge tube will be sufficient, but if the size of the original is increased a plurality of powerful high output type xenon flash discharge tubes, and consequently a bulky system of capacitors, will be required. This problem, again, increases in direct proportion to the increase in size of the original to be copied.

Therefore, as the size of the original which is to be copied increases, the power output of the electromagnetic source for irradiating the superposition of the heat sensitive sheet and the original, and also the total pressure which must be exerted on the superposition increase greatly, and therefore the cost and the massiveness of such a device become quite unrealistic.

SUMMARY OF THE INVENTION

The present invention considers the defects as outlined above which are present in conventional flash type thermography devices. Further, in attempting to extend the useful range of such thermography to larger sized originals, the present invention takes cognizance of the fact that double exposure to electromagnetic radiation of such a superposition of a heat sensitive sheet and an original bearing a pattern thereon produces substantially no different effect on the heat sensitive sheet than the effect produced by a single exposure. This is particularly the case where the superposition of a heat sensitive sheet and an original is clamped by a high pressing force enough to ensure good heat transfer from the black portions of the original to the heat sensitive sheet, because the initial exposure to electromagnetic radiation almost completely perforates or discolors the portions of the heat sensitive sheet which oppose the patterns of the original, and another exposure to electromagnetic radiation can scarcely affect these portions of the heat sensitive sheet.

Therefore, it has occurred to the present inventors that, if two successive exposures to electromagnetic radiation are performed upon two adjacent portions of a superposition of a heat sensitive sheet and an original bearing a pattern to be copied, the margin which has been exposed twice will not stand out badly in the result.

Therefore, it is an object of the present invention to propose a method to expose a sheet, or, in particular, a sheet assembly which is a superposition of a heat sensitive sheet and an original bearing a pattern made of an infrared radiation absorptive material, to successive irradiations of electromagnetic radiation, portion by portion, these portions overlapping slightly, so that eventually the entire surface required to be irradiated with electromagnetic radiation is so treated.

It is a further object of the present invention to provide such a device which materializes the above-mentioned method. The device may be quite compact, light and economical to manufacture while it can process thermographic sheets of fairly large sizes.

These, and other, objects are achieved, according to the present invention, by a device for exposing a sheet to electromagnetic radiation while under pressure, comprising: a light source; a light transmitting plate arranged with the light source on its one side; a pressure plate which opposes the other side of the light transmitting plate; a means for biasing at least one of the light transmitting plate or the pressure plate towards and away from each other; a means for transporting a sheet passing between the light transmitting plate and the pressure plate; and a means for controlling the light source, the biasing means, and the transporting means, which causes the light source to emit light when the pressure plate and the light transmitting plate are pressed against each other with the sheet between them, and which causes the transporting means to transport the sheet through a distance less than the width of the light transmitting plate, when the light transmitting plate and the pressure plate are relatively biased away from one another.

With this device, a sheet may be irradiated with electromagnetic radiation while under pressure, portion by portion, these portions overlapping slightly, so as to achieve substantially the same effect as though the entire sheet were treated at one time, with the same amount of electromagnetic radiation being provided per unit area of the sheet, and the same amount of force per unit area of the sheet being provided. However, the present invention requires only a small total amount of electromagnetic radiation to be emitted at any one time, and a small total amount of force to be exerted at any one time, than would be necessary if the entire sheet were treated at one time.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purposes of illustration and exemplification only, and are in no way to be taken as limitative of the scope of the present invention. In the drawings.

DESCRIPTION OF THE PREFERRED EMBODIMENT

The present invention will now be described, with reference to the drawings, in terms of a preferred embodiment thereof.

Figure 1:
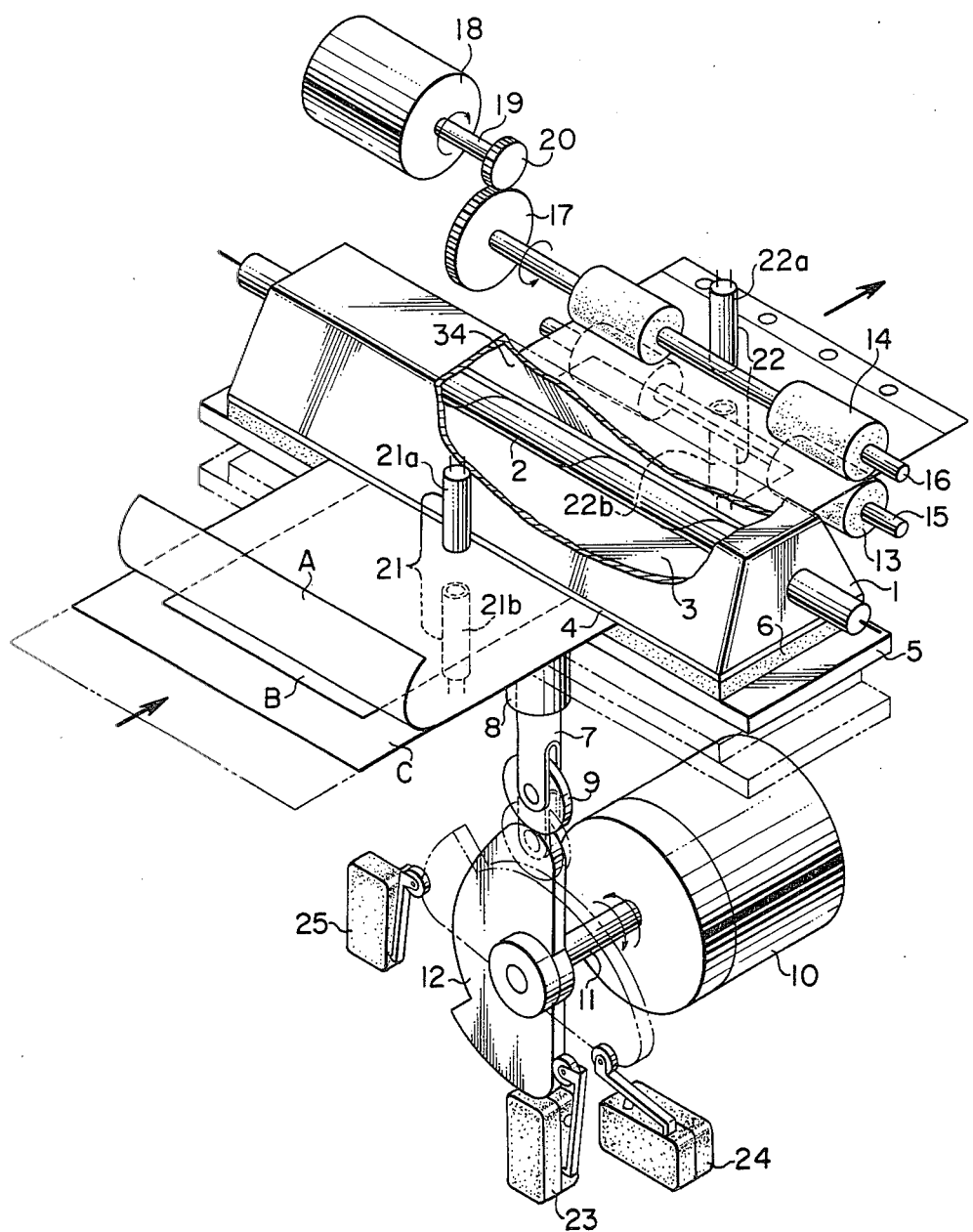
FIG. 1 is a perspective view, partly cut away, showing the essential parts of a preferred embodiment of the divided exposure device according to the present invention.
Figure 2:
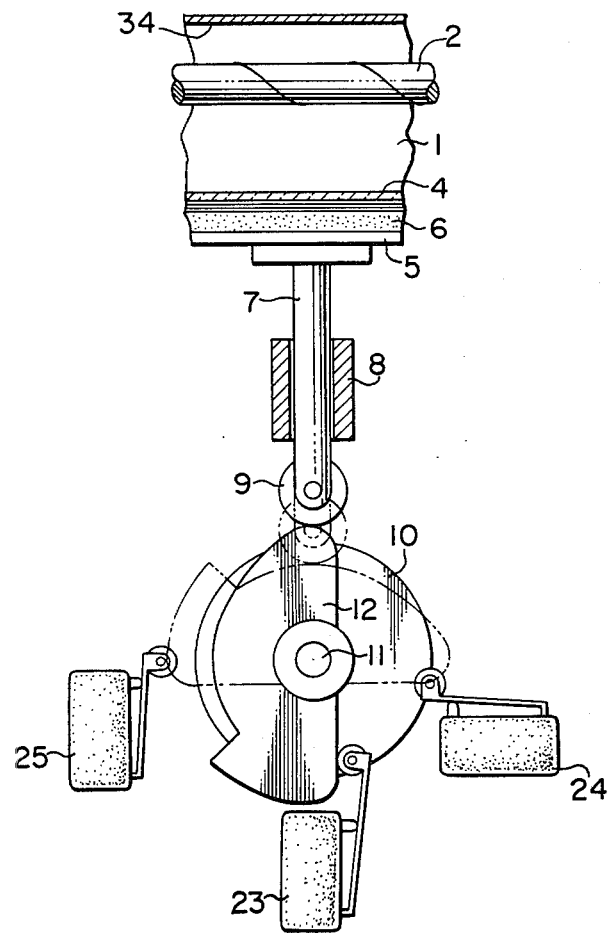
FIG. 2 is a vertical sectional view through the preferred embodiment shown in FIG. 1, which shows certain important parts of the device, and is taken along a plane which is the plane of an actuating cam used in the device.

The divided exposure device of FIGS. 1 and 2 is provided with a light source box 1 which is fixed to the frame of the divided exposure device; this frame is not shown in the drawings. The internal surfaces of the upper and side walls of the light source box 1 are covered with mirrors 34, and along the axis of the light source box 1 there is fixed a xenon flash discharge tube 2. The bottom of the light source box 1 constitutes a light exposure window 3 which is covered by a transparent glass plate 4. Thus, when the xenon flash discharge tube 2 is flashed, electromagnetic radiation including light rays and infrared rays emitted thereby is either directed directly downwards to the glass plate 4, or is reflected by the above mentioned reflecting mirrors 34 arranged around the inside surfaces of the light source box 1 so as to be thereby reflected downwards to the transparent glass plate 4. Here the arrangement is such that this electromagnetic radiation is uniformly distributed over the entire surface of the glass plate 4. This light source box 1 is of a per se well known construction, and, in this embodiment, is fixedly mounted to the frame of the divided exposure device.

Below the glass plate 4 of the light source box 1 there is provided a backing pressure plate 5, and, on the upper surface of this pressure plate 5, there is provided a resilient cushion element 6, which opposes substantially the entire surface of the glass plate 4 mounted in the exposure window 3, and which has substantially the same size as the exposure window 3. The pressure plate 5 is movable upwards and downwards in the drawing, between the highest or applied position shown by solid lines in FIG. 1, in which it is applied to the glass plate 4, and the lowest or withdrawn position shown by phantom lines in FIG. 1, in which it is lowered down from said applied position and is withdrawn from the glass plate 4 so that a certain gap is formed between the upper surface of the cushion element 6 and the lower surface of the glass plate 4. As more clearly shown in FIG. 2, which is a sectional view taken through the device shown in FIG. 1 along a vertical plane which includes the plane of an actuating cam 12 to be described later, to the lower side of the pressure plate 5 there is fixed a supporting lift rod 7, at approximately the center of the pressure plate 5, and this rod 7 slides upwards and downwards, guided by a guide support sleeve 8, which is fixed to the frame (not shown in the drawings) of the divided exposure device. This lift rod 7 serves both for supporting the pressure plate 5 and the cushion element 6, and for moving them between their highest or applied position and their lowest or withdrawn position.

At the other lower end of the lift rod 7 there is rotatably supported a cam follower roller 9 on a shaft mounted to the rod 7, and this roller 9 is engaged with an actuating cam 12 which drives it upwards or lets it fall downwards. This actuating cam 12 is fitted to a rotary output shaft 11 of a reversible electric drive system 10. Thus, the drive system 10 is capable of reversibly driving the cam 12 between the position shown in FIG. 2 by solid lines and the position shown in FIG. 2 by phantom lines. In fact, the drive system 10 comprises a reduction gearbox which is not clearly shown in the drawing, so that the rotational speed provided at the output shaft 11 of the drive system 10 is quite low, but, correspondingly, the rotational power provided thereat is quite high.

In more detail, first, when the cam 12 is in the position shown in FIG. 2 by solid lines, then it impels the cam follower roller 9 to its uppermost position, and thus the lift rod 7 and the pressure plate 5 and cushion element 6 attached thereto are driven to their uppermost or applied position, wherein the cushion element 6 is pressed tightly against the glass plate 4 of the light source box 1. The cam 12 is driven by the drive system 10 in the clockwise direction from the position shown in FIG. 2 by solid lines, so that progressively the cam follower roller 9, the lift rod 7, the pressure plate 5 and cushion element 6 are lowered downwards in the drawing, until the cam 12 reaches its position shown in FIG. 2 by phantom lines, which is the extreme position in the clockwise direction which it can attain, as will be seen later. In this position the cam follower roller 9 is lowered to its lowermost position, as shown in FIG. 2 by phantom lines. Thereby, the lift rod 7, the pressure plate 5, and the cushion element 6 are lowered to their lowermost position, as shown by phantom lines in FIG. 1, in which the cushion element 6 is separated by a certain gap from the glass plate 4. On the other hand, when, from this position shown by phantom lines in FIG. 2, the actuating cam 12 is driven by the drive system 10 in the counterclockwise direction, then progressively in a reverse fashion to that explained above the cam follower roller 9, the lift rod 7, the pressure plate 5, and the cushion element 6 are driven upwards in the figure, until the cushion element 6 is again tightly clamped against the glass plate 4.

A lower roller shaft 15 and an upper roller shaft 16 are provided in parallel, with the upper shaft 16 being above the lower shaft 15, these roller shafts being one on each side, approximately, of the plane containing the glass plate 4 in the exposure window 3. On the lower roller shaft 15 there are mounted two lower rollers 13, and this shaft 15 is free to rotate about its longitudinal axis. On the upper shaft 16 there are fixedly mounted two upper drive rollers 14, which are rotated thereby. At an extreme end of the upper shaft 16 there is mounted a first gear wheel 17, which engages with a second gear wheel 20 which is mounted on the end of a power output shaft 19 of a sheet drive electric motor 18.

This arrangement, comprising the motor 18, the upper shaft 16, the upper drive rollers 14, etc., is a drive mechanism for driving sheets between the glass plate 4 and the cushion element 6. That is to say, when the electric motor 18, via the shaft 19, the gear wheel 20, and the gear wheel 17, drives the upper shaft 16 and the upper drive rollers 14 mounted thereon in the counterclockwise direction in FIG. 1, as shown by the arrow, then a sheet such as shown in the drawing as engaged between the upper rollers 14 and the lower rollers 13 will be driven in the direction shown by an outline arrow in the drawing, and will be thus pulled between the glass plate 4 and the cushion element 6.

According to the function of the shown preferred embodiment, this sheet is intended to be composed of a superposition of a heat sensitive mimeograph stencil sheet A, an original sheet B, and a white base sheet C. The heat sensitive stencil sheet A and the white base sheet C are provided as attached together along their one edge, which is the upper right hand edge as seen in FIG. 1, and the original sheet B is sandwiched in between them, in order to perform mimeographic stencil production, as will be explained later. In other embodiments of the divided exposure device of the present invention, however, other types of electromagnetic radiation sensitive sheets could be used. The present invention is not intended to be limited to the use of heat sensitive sandwiches of stencil sheets, and base sheets with originals in between.

The control of the operation of the device whose main mechanical parts are outlined above is performed by a control system which will be explained in detail hereunder. An outline of the functional operation of this control system is as follows.

The resilient cushion element 6, in the start or rest state, is separated by a certain gap from the transparent glass plate 4 in the light exposure window 3. If a sheet, such as the above outlined superposition of a heat sensitive mimeograph stencil sheet A, an original sheet B, and a white base sheet C, are moved towards and placed between the pressure plate 5 and the glass plate 4, so that its edge enters between the lower rollers 13 and the upper rollers 14, then the following things happen.

First, the upper shaft 16 and the upper rollers 14 are driven by the electric motor 18 so as to pull the sheet to a certain extent in the direction indicated by the arrows in FIG. 1, and at the same time the actuating cam 12 is rotated in the counterclockwise direction by the reversible electric drive system 10 and drives upwards the lift rod 7 and the pressure plate 5 and the cushion element 6 mounted thereon. At a certain stage during this rising, the electric motor 18 is de-energized so as to stop the movement of the sheet. The pressure plate 5 and the cushion element 6 continue to be raised, until the sheet is tightly squeezed between the cushion element 6 and the glass plate 4 in the exposure window 3. Then the xenon flash discharge tube 2 is flashed to expose that part of the sheet which is clamped between the cushion element 6 and the glass plate 4 to irradiation by electromagnetic radiation.

Thereafter, the actuating cam 12 is driven by the reversible electric drive system 10 in the clockwise direction in FIG. 2, so as to lower the pressure plate 5 and the cushion element 6 away from the glass plate 4 in the exposure window 3. When the pressure plate 5 is lowered, the electric motor 18 is again activated so as to pull the sheet further between the lower rollers 13 and the upper rollers 14, and so as to move substantially all of, but not quite all of, the exposed portion of the sheet out from between the cushion element 6 and the glass plate 4, and to bring the subsequent unexposed, portion of the sheet in between the cushion element 6 and the glass plate 4, together with a certain small margin of the forgoing exposed portion.

Meanwhile, as the sheet moves, the pressure plate 5 and the cushion element 6 are again being raised upwards by the cam 12, which is being rotated counterclockwise by the drive system 10, towards the glass plate 4 mounted in the exposure window 3, and, before the cushion element 6 reaches the glass plate 4, the transport of the sheet is stopped by the de-energization of the electric motor 18 driving the upper rollers 14. It is arranged that at this time the subsequent unexposed, portion of the sheet will have been brought between the cushion element 6 and the glass plate 4, but, in fact, as mentioned above, the exposed portion of the sheet will not have been completely removed away from between the cushion element 6 and the glass plate 4, so that a certain overlap occurs.

After this stopping of the electric motor 18, the pressure plate 5 and the cushion element 6 continue to rise, until the new portion of the sheet is clamped tightly between the cushion element 6 and the glass plate 4. Then the flash discharge tube 2 is again flashed, so as to expose this new portion of the sheet to irradiation of electromagnetic radiation.

This cycle is repeated continually until substantially all of the sheet has been exposed in successive strips which are overlapped by a certain amount to irradiation by electromagnetic radiation. Finally, the electric motor 18 is activated so as to eject the sheet from the upper right hand part of the machine as seen in FIG. 1.

The combination of photoelectric cells and switches, limit switches, and other electrical and mechanical means used for performing the above outlined control of the electric motor 18 and the reversible electric drive system 10, etc., in the shown embodiment, will now be explained in detail.

With respect to the direction of transport of the sheet, in a position before the light source box 1, there is provided a first photoelectric sensor 21, which comprises a first sensor light source 21a and a first light sensitive element 21b, which are arranged with the light source 21a above the light sensitive element 21b so as to illuminate it, in such a fashion that, when the sheet passes between the light source 21a and the light sensitive element 21b, this illumination is interrupted. Further, in a position after the light source box 1, with respect to the direction of transport of the sheet, there is provided a second photoelectric sensor 22, similarly comprising a second sensor light source 22a and a second light sensitive element 22b, which are similarly arranged with the light source 22a above the light sensitive element 22b so as to illuminate it, and in such a fashion that, when the sheet passes between the light source 22a and the light sensitive element 22b, this illumination is interrupted. The light sensitive element 21b is so constituted that its two terminals are connected together when and only when it is not illuminated by the light source 21a; and similarly the light sensitive element 22b is so constituted that its two terminals are connected together when and only when it is not illuminated by the light source 22a.

Three limit switches are provided and are arranged so as to be actuated by motion of the actuating cam 12. The first limit switch 23 is so arranged as to be actuated only when the cam 12 is in the position shown by solid lines in FIG. 2, and is normally in the open condition, but, when it is actuated by pressure on its actuator, it is put into the closed condition. In fact, this first limit switch 23 is provided with two pairs of contacts, the first contacts 23a and the second contacts 23b. The second limit switch 24 is so arranged as to be actuated, by pressure upon its actuating member, only when the cam 12 is in the position shown by phantom lines in FIG. 2, and is normally in the closed condition, whereas, when its actuator is pressed, it is put into the open condition. In fact, this second limit switch 24 is provided with two sets of contacts, the first contacts 24a and the second contacts 24b. Further, a third limit switch 25 is provided, which is normally in the open condition, but is put into the closed condition when pressure is exerted on its actuating member. The cam 12 presses upon the actuating member of the third limit switch 25, to close it, only when the cam 12 is in a position between its position shown by phantom lines in FIG. 2 and a position in which it has been turned counterclockwise from its position shown by phantom lines in FIG. 2 through a certain angle, shown in the drawing as being approximately 45°. The third limit switch 25 has only one pair of contacts.

In other words, with reference to the movement of the pressure plate 5 and the cushion element 6 upwards and downwards, the contacts 23a and 23b of the first limit switch 23 are normally open, but are closed when the pressure plate 5 and the cushion element 6 are substantially at the top of their travel, i.e., are in their applied position; the contacts 24a and 24b of the second limit switch 24 are normally closed, but are opened only when the pressure plate 5 and the cushion element 6 are substantially at the bottom of their travel, i.e. are in their fully withdrawn position; and the third limit switch 25 is normally open, but is closed whenever the pressure plate 5 and the cushion element 6 are in a position in their travel which is lower than a certain intermediate position therein, i.e., when the cushion element 6 is at least somewhat withdrawn from the glass plate 4 mounted in the exposure window 3 of the light source box 1.

Figure 3:
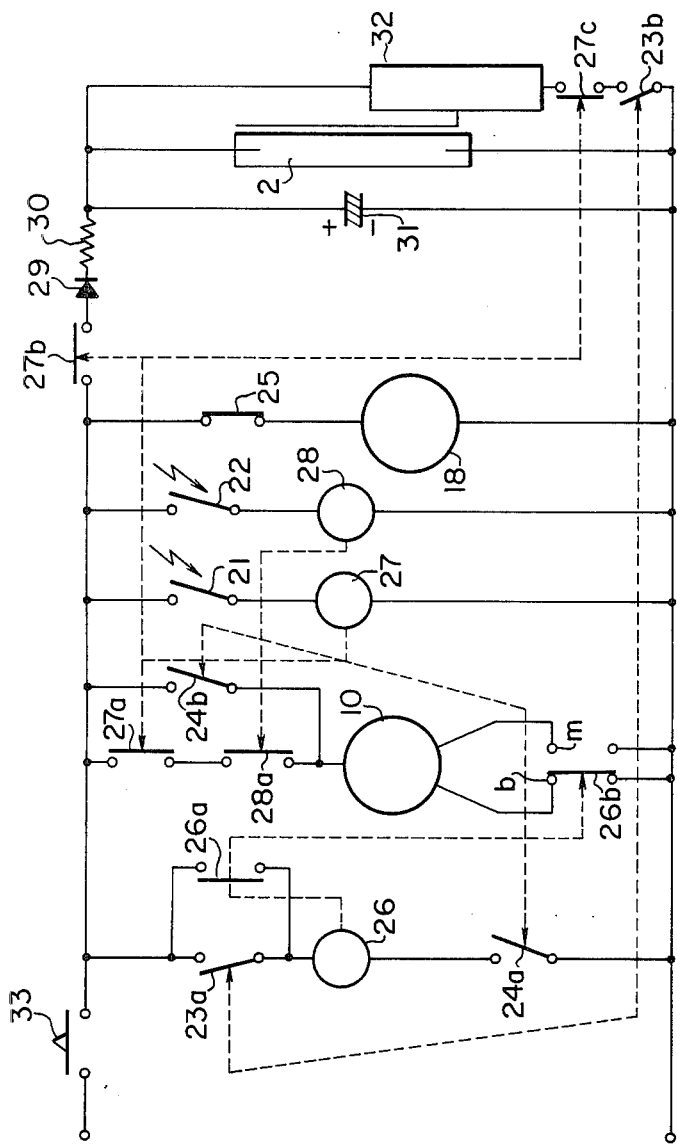
FIG. 3 is a circuit diagram, showing the construction of a control circuit used in the preferred embodiment shown in FIGS. 1 and 2 for controlling the operation of the motors and the xenon discharge tube of the divided exposure device according to the present invention.

FIG. 3 shows the electrical circuit in which these photoelectric switches and limit switches are incorporated. In FIG. 3, certain elements which are the same elements as shown in FIGS. 1 and 2 are designated by the same reference numerals as in those figures. A first relay 26 is provided, which has two sets of contacts, first contacts 26a and second contacts 26b. A second relay 27 is provided, which has three pairs of contacts, first contacts 27a, second contacts 27b, and third contacts 27c. In more detail, the second contacts 26b of the first relay 26 comprise a contact member which can be moved between two positions, a position in which it connects the pair of contacts b or the break contacts, and a position in which it connects the pair of contacts m or the make contacts. The first relay 26 is so arranged that its first contacts 26a move between the open condition and the closed condition, as its second contacts 26b move between the condition of connecting the b or break contacts, and the condition of connecting the m or make contacts, simultaneously. Further, in the second relay 27, the first contacts 27a, the second contacts 27b, and the third contacts 27c thereof pass from the connected condition to the disconnected condition, and vice versa, simultaneously. There is further provided a third relay 28, which has one pair of contacts, the contacts 28a. Further, there are provided a diode 29, a resistor 30, a capacitor 31, a trigger circuit 32, and an electric power source switch 33. The connections of these various elements and contacts are shown in the drawing.

The state of the switches and contacts shown in FIG. 3 is the state in which the actuating cam 12 is in its position illustrated in FIGS. 1 and 2 by phantom lines, i.e., its position wherein it is rotated to its extreme position in the clockwise direction, and in this position the pressure plate 5 and the cushion element 6 are in their lowermost or withdrawn position, away from the glass plate 4 in the exposure window 3. Thus, in this position, a gap exists between the glass plate 4 and the cushion element 6. Further, the condition shown in FIG. 3 is one in which no sheet is being passed past the first photoelectric sensor 21 or the second photoelectric sensor 22 so as to interrupt illumination of the first light sensitive element 21b or of the second light sensitive element 22b.

The operation of this divided exposure device is as follows. Starting from the state shown in FIG. 3, first the switch 33 is closed by the operator so as to start up the divided exposure device, and so as to supply power to the sheet drive electric motor 18, via the third limit switch 25 which is closed. Thereby, the upper drive rollers 14 are turned in the anticlockwise direction in FIG. 1, and the lower drive rollers 13 are turned in the clockwise direction by rubbing against them.

Next, a sheet, such as an above described superposition of a heat sensitive mimeograph stencil sheet A, an original sheet B, and a white base sheet C, is supplied to the lower left hand side, as seen in FIG. 1, of the machine, so as to pass between the resilient cushion element 6 and the transparent glass plate 4. First, the leading edge of this sheet passes between the light source 21a and the light sensitive element 21b of the first photoelectric sensor 21, so as to interrupt illumination of the light sensitive element 21b and cause it thereby to become continuous, and this provides power to the second relay 27. Therefore, the first, second, and third contacts 27a, 27b, and 27c of the second relay 27 are all put into the closed condition, simultaneously. By the closing of the contacts 27b, the capacitor 31 starts to be charged, via the diode 29 and the resistor 30. The closing of the contacts 27a and 27c has no direct effect as yet, because the contacts 28a of the third relay 28 and the second contacts 23b of the first limit switch 23 are still open. The leading edge of the sheet continues to be inserted, by the operator, in between the cushion element 6 mounted on the pressure plate 5 and the glass plate 4 in the exposure window 3, and emerges from the other side thereof, and, next, passes between the light source 22a and the light sensitive element 22b of the second photoelectric sensor 22, thus interrupting illumination of the light sensitive element 22b and causing it to become continuous. This causes electric power to be supplied to the third relay 28, and thereby the contacts 28a are closed. Because the contacts 27a are already closed, and the b or break terminals of the second contacts 26b of the relay 27 are connected, electric power is supplied to the reversible electric drive system 10, so as to turn it in the counterclockwise direction as seen in FIG. 2. Thus, the actuating cam 12 is driven in an anticlockwise direction from its position shown in FIG. 2 by phantom lines.

By this motion of the cam 12, the cam follower roller 9 is driven upwards in the figure, and thereby, via the lift rod 7, the pressure plate 5 with the cushion element 6 mounted thereon is driven upwards in the figure from its lower or withdrawn positions. Almost immediately, therefore, the first contacts 24a and the second contacts 24b of the second limit switch 24, which were open when the cam 12 pressed upon the actuating member of the second limit switch 24, are now closed. This has no direct effect at this time, however, because the first limit switch first contacts 23a and the first relay first contacts 26a are both open, and also the second relay first contacts 27a and the third relay contacts 28a are both closed. Thereby, at this time, the sheet continues to be drawn in the direction shown in the drawing by the arrows, between the lower rollers 13 and the upper rollers 14, by the action of the electric motor 18, and, further, the pressure plate 5 and the cushion element 6 continue to rise.

Next, the cam 12 is rotated sufficiently in the counterclockwise direction in FIG. 2, beyond the abovementioned predetermined angle, from its position shown in FIG. 2 by phantom lines, for it to stop pressing on the actuator of the third limit switch 25. Thereby, the contacts of the third limit switch 25 are opened. This causes the supply of electric power to the electric motor 18 to be stopped, and, accordingly, the rotation of the upper rollers 14 and the lower rollers 13 stops, and the movement of the sheet in the direction shown by the arrows in FIG. 1 also stops, so that the sheet is now stationary, with a first strip thereof located between the cushion element 6 mounted on the pressure plate 5 and the glass plate 4 in the exposure window 3. At this time, the cushion element 6 is not yet squeezing this portion of the sheet against the glass plate 4.

Next, the cam 12 continues to rotate, driven by the drive system 10, in the counterclockwise direction shown in FIG. 2, and the cam follower roller 9, the lift rod 7, the pressure plate 5, and the cushion element 6, driven thereby, continue to rise until the cam 12 reaches its position shown in FIG. 2 by solid lines, in which condition the cushion element 6 is pressed tightly upwards, squeezing the said strip portion of the sheet between it and the glass plate 4 mounted in the exposure window 3 with a certain substantial amount of squeezing force. When the cam 12 reaches its position shown by solid lines in the drawing, it presses on the actuator of the first limit switch 23, and changes this limit switch from its normally open condition to the closed condition. Thus, its first and second contacts 23a and 23b are both closed. The closing of the contacts 23b, since the third contacts 27c of the second relay 27 are already closed, causes the trigger circuit 32 to be provided with electric power, and, accordingly, the tube 2 is flashed. This causes the said strip area on the sheet which opposes the glass plate 4 mounted in the exposure window 3 to be supplied with irradiation of electromagnetic radiation, and exposed. Thus, in this embodiment, a strip part of the heat sensitive mimeograph stencil sheet A is perforated. Further, the closing of the contacts 23a of the first limit switch 23, since the first contacts 24a of the second limit switch 24 are, as explained above, already closed, causes power to be supplied to the first relay 26. Therefore, the first relay first contacts 26a are closed, and the first relay second contacts 26b are changed from the condition in which the break contacts b are connected, to the condition in which the make contacts m are connected. By this change of condition of the contacts 26b, the motion of the reversible electric drive system 10 is reversed, and thereby the actuating cam 12 now starts to move in the clockwise direction in FIG. 2, so as to start lowering the roller 9, the lift rod 7, the pressure plate 5 and the cushion element 6 away from the glass plate 4 mounted in the exposure window 3. Further, by the closing of the first contacts 26a of the first relay 26, the first relay 26 provides itself with electric power, independently of the first contacts 23a of the first limit switch 23, so that a supply of electric power to the first relay 26 is now only controlled by the first contacts 24a of the second limit switch 24. Thus, this clockwise rotation of the cam 12, which, as described above, is obtained by the second contacts 26b of the first relay 26, is maintained, until the cam 12 returns to its position shown by phantom lines in FIG. 2, i.e., to its extreme clockwise position.

Almost immediately during the lowering process of the pressure plate 5 and the cushion element 6, the first and second contacts 23a and 23b of the first limit switch 23 are opened, but, as described above, the opening of the contacts 23a has no effect upon the reverse operation of the reversible electric drive system 10 controlled by the second contacts 26b of the first relay 26. Further, the opening of the first limit switch second contacts 23b has no effect at this time, because the flash discharge tube 2 has already been flashed by the trigger circuit 32.

Next, the cam 12 continues its clockwise rotation until it presses upon the actuator of the third limit switch 25, which has been open, but which is now moved into the closed condition. This occurs when the pressure plate 5 and the cushion element 6 have been moved somewhat downwards past an intermediate position in their travel. This closing of the contacts of the third limit switch 25 causes supply of electric power to the electric motor 18 to be recommenced, and, accordingly, movement of the sheet between the lower rollers 13 and the upper rollers 14 is restarted, by the driving action of the electric motor 18.

Next, when the cam 12 returns to its fully clockwise position as seen in FIG. 2, then it presses upon the actuator of the second limit switch 24, which has been closed, but which is now opened by this pressure. Thus, by the opening of the first contacts 24a of this second limit switch 24, supply of electric power to the first relay 26 is positively interrupted, and, accordingly, firstly, the first contacts 26a of the first relay 26 become open, thus re-establishing the control of the first contacts 23a of the first limit switch 23 over the supply of electric power to the first relay 26, and, secondly, the second contacts 26b of the first relay 26 return from their condition wherein the make contacts m thereof are connected to their condition wherein the break contacts b thereof are connected. Further, by the opening of the second contacts 24b of the second limit switch 24, the control of the first contacts 27a of the second relay 27 and the contacts 28a of the third relay 28 over the power supply to the reversible electric drive system 10 is briefly re-established. However, this condition does not persist for long, because, assuming that both the illumination of the first light sensitive element 21b by the light source 21a and the illumination of the second light sensitive element 22b by the light source 22a are still interrupted by the presence of portions of the sheet therebetween, power will still be supplied to the drive system 10, and, accordingly, the drive system 10 will again be driven, now, in the anticlockwise direction as seen in FIG. 2, so as almost immediately to release the pressure exerted by the cam 12 upon the actuating member of the second limit switch 24, and to allow this second limit switch 24 to return to its normally closed condition from its open condition. Accordingly, the first and second contacts 24a and 24b of the second limit switch 24 will be again closed. Thus, the control of the second relay first contacts 27a and the third relay contacts 28a over the supply of power to the drive system 10 is stopped by the closing of the second limit switch second contacts 24b, while on the other hand because of the opening of the first contacts 26a of the first relay 26, the closing of the first contacts 24a of the second limit switch 24 will not actuate the first relay 26, because the first contacts 23a of the first limit switch 23 are open.

This action is now repeated, as long as the first photoelectric sensor 21 continues to detect the presence of the sheet between the light source 21a and the light sensitive element 21b thereof. Thereby, successive strips of the sheet are exposed to flashings of the xenon flash discharge tube 2, and are irradiated with supply of electromagnetic radiation, so that the thermographic process is performed over the entire surface of this sheet, which, in this preferred embodiment, is such a combination as described above.

However, when the trailing edge of the sheet passes the first photoelectric sensor 21, so that illumination of the light sensitive element 21b by the light source 21a is no longer interrupted, then the second relay 27 will no longer be provided with a supply of electric power. Accordingly, the first, second, and third contacts 27a, 27b, and 27c of the second relay 27 are put into the open condition. By the opening of the third contacts 27c, the supply of power to the trigger circuit 32 is prevented, so that the tube 2 will no longer be flashed. By the opening of the second contacts 27b, the charging of the capacitor 31 via the diode 29 and the resistor 30, and thus the supply of power to the tube 2, is also prevented. By the opening of the first contacts 27a, the supply of electric power to the drive system 10, via the first contacts 27a of the second relay 27, and via the contacts 28a of the third relay 28, is prevented, but however, in general, the supply of electric power via the second contacts 24b of the second limit switch 24 to the reversible electric drive system 10 will still continue. Thus, the cycle will continue, until the cam 12 reaches its position shown in FIG. 2 by the phantom lines, in which the second limit switch 24, which normally is closed, is opened thereby. Accordingly, the second limit switch second contacts 24b will become open, and in this condition the supply of electric power to the drive system 10 is definitely and completely stopped. In other words, if at the time the trailing edge of the sheet moves away from between the light source 21a and the light sensitive element 21b of the first photoelectric sensor 21, the cam 12 happens to be in its furthest clockwise position in FIG. 2, as shown by the phantom lines, i.e., the pressure plate 5 and the cushion element 6 happen to be in their lowermost or fully withdrawn position, then the drive system 10 will immediately stop, but otherwise the motion of the drive system 10 will be continued until the pressure plate 5 and the cushion element 6 reach this aforesaid lowermost or retracted position. Thus, after completing the thermographic or exposure process for one sheet, the pressure plate 5 and the cushion element 6 mounted thereon are always returned to their retracted or withdrawn positions and left there.

Further, when the pressure plate 5 and the cushion element 6 have reached this fully withdrawn position, and the drive system 10 has been stopped by the opening of the second contacts 24b of the second limit switch 24, since in this condition the contacts of the third limit switch 25 are closed, electric power will continue to be supplied to the electric motor 18, to drive the lower rollers 13 and the upper rollers 14, so as to continue to move the sheet in the direction indicated by arrows in FIG. 1, so as to eject it from the machine. This operation of the electric motor 18 driving the lower and upper rollers 13 and 14 will continue until the switch 33 is switched off by the operator of the machine.

Thus, it is seen that, according to the present invention, successive strips of the sheet are exposed to flashings of electromagnetic radiation from the xenon flash discharge tube 2, while in tightly pressed together conditions. Further, these strips are slightly overlapped, so that it is properly ensured that substantially the entire operative surface of the thermographic combination of the heat sensitive mimeographic stencil sheet A, the original sheet B, and the white base sheet C is exposed to a sufficient amount of electromagnetic radiation to provide proper preparation of the stencil sheet A for stencil printing. It is also seen that, because only a relatively narrow strip of the sheet is exposed by each flashing of the tube 2, thereby the pressure which is applied between the cushion element 6 and the glass plate 4 upon this exposed area, per unit of area, can be made much greater, than if it was required to expose the entire area of the sheet at one time. In fact, a sheet of substantially unlimited length in the direction of travel of the sheet may be exposed, in successive strips, by the device outlined above.

The double exposure of the overlapping margins of the exposed portions on the sheet, in most applications, will provide no substantial problem. It is to be noted that, if the choice must be made, it is more desirable that these overlapped margins should be larger than a very small amount, rather than small margins which might occasionally not exist at all so that unexposed areas could eventually occur between the exposed portions of the sheet. Therefore, during the process of adjustment of the limit switches and the photoelectric switches detailed above, in this embodiment, it is desirable that this adjustment should be so made that the width of overlap of the exposed portions on the order of about one centimeter or so, in order to allow for fluctuations in the adjustment and operation of the divided exposure device of the present invention which may occur during and after long periods of use thereof.

In the above described embodiment, the flashing of the xenon flash discharge tube 2, when the cam 12 is in the position shown by solid lines in FIG. 2, and thus when the pressure plate 5 and the cushion element 6 are in their uppermost or applied positions pressing the sheet against the glass plate 4 is performed by the closing of the second contacts 23b of the first limit switch 23. However, this is not essential, nor should it be considered as limitative of the present invention, because, for example, this flashing of the tube 2 could also be performed according to the action of a pressure switch which sensed the contact pressure between the cushion element 6 and the glass plate 4, and which was arranged to flash the tube 2 when this contact pressure reached a certain predetermined value.

Further, in the above described preferred embodiment, the light source box 1 is shown as fixed to the frame of the machine, while the pressure plate 5 and the cushion element 6, mounted thereon, have been shown as movable by the arrangement comprising the reversible electric drive system 10, the actuating cam 12, etc. However, this is not to be considered limitative of the divided exposure device according to the present invention, for it would be possible for the pressure plate 5 and the cushion element 6 to be fixed, and the light source box 1 to be movable, as an alternative.

Further, a device according to the present invention could be used to provide divided exposure of a different sort of sheet from the one described above with reference to a stencil sheet. For example, the present invention could be applied to the case of reproduction using ultraviolet ray sensitive materials. However, it should be noted that a heat-meltable sheet is the most pertinent one to the method of the present invention among the various kinds of heat sensitive sheets. This is because if a heat-meltable sheet is superposed with an original and fed into the divided exposure device of the present invention, the parts which touch with the heat-generating patterns of the original, after exposure, melt and stick to the original, so that these two sheets keep their relative position unchanged and no eventual slipping between them occurs during the course of the repetitive pressings and the subsequent transportings. A heat sensitive mimeograph stencil sheet is, of course, a kind of heat-meltable sheet.

Further, the above described particular arrangement of limit switches, photoelectric switches, etc., is not to be considered as limitative of the present invention, since there are many possible variations which could be conceived of by one skilled in the art and made in this control system.

Therefore, although the present invention has been shown and described in terms of a preferred embodiment thereof, and in language more or less specific with regard to structural features thereof, and with reference to the illustrative drawings, it should be understood that in any particular embodiment of the present invention various changes, modifications, and omissions of the form and the detail thereof can be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawings.

We claim:

1. A method for exposing a sheet assembly superposed one sheet over the other comprising the following steps:
    subjecting a sheet of substantially transparent heat alterable substance and an original sheet with a totally integral image thereon to light radiation while under pressure, wherein successive portions of the sheet assembly which bear different parts of said image but slightly overlap one another are sequentially clamped between a pressure plate and a light transmitting plate, with the original sheet being closer to the pressure plate, and are irradiated with electromagnetic radiation through the light transmitting plate in the clamped condition.

2. A method according to claim 1, wherein repetitively: one portion of the sheet assembly is clamped between the pressure plate and the light transmitting plate, then said one portion is irradiated with electromagnetic radiation through the light transmitting plate while said clamping is maintained, then the clamping of said one portion between the pressure plate and the light transmitting plate is released, and then the sheet assembly is moved between the pressure plate and the light transmitting plate so that a portion of the sheet assembly, adjacent to said one portion and slightly overlapping it, is brought between the pressure plate and the light transmitting plate.

3. A method according to either claim 1 or claim 2, wherein said irradiation by electromagnetic radiation is performed by flashing.

4. A method according to either claim 1 or claim 2, wherein the material of said sheet of substantially transparent heat alterable substance is such that it is easily meltable with heat so as to adhere to the original, but also is thereafter easily detachable therefrom by pulling.

5. A method according to claim 4, wherein said irradiation by electromagnetic radiation is performed by flashing.

6. A device for exposing a sheet to electromagnetic radiation while under pressure, comprising:
    a light source;
    a light exposure window having a certain width through which the sheet is exposed to the electromagnetic radiation while under pressure;
    a light transmitting plate arranged to traverse the light exposure window with the light source on its one side;
    a pressure plate which opposes the other side of the light transmitting plate;
    a means for relatively biasing the light transmitting plate and the pressure plate towards and away from one another;
    a means for transporting the sheet through and between the light transmitting plate and the pressure plate in the direction to traverse the width of the light exposure window; and
    a means for controlling the light source, the biasing means, and the transporting means, which causes the light source to emit light when the pressure plate and the light transmitting plate are pressed against each other with the sheet between them, and which causes the transporting means to transport the sheet through a distance less than the width of the light exposure window, when the light transmitting plate and the pressure plate are separated by more than a certain predetermined distance wherein successive portions of the sheet, bearing different parts of an image thereon slightly overlapping one another, are sequentially clamped between said pressure plate and said light transmitting plate and are irradiated with electromagnetic radiation through the light transmitting plate in the clamped condition.

7. A device according to claim 6, wherein the light source is a flash tube.

8. A device according to claim 6 or claim 7, wherein the controlling means comprises:
   a first limit switch which comprises a first and a second pair of first limit switch terminals, each pair being connected to one another when and only when the pressure plate and the light transmitting plate are substantially in their closest relative position;
   a second limit switch which comprises a first and a second pair of second limit switch terminals, each pair being disconnected from one another when and only when the pressure plate and the light transmitting plate are substantially in their furthest apart relative position;
   a third limit switch comprising a pair of third limit switch terminals which are connected to one another when and only when the pressure plate and the light transmitting plate are separated by a distance greater than a certain predetermined distance;
   a first relay comprising a pair of first relay terminals which are connected together when and only when said first relay is provided with electric power, the first relay also controlling the direction of relative movement provided by the biasing means between the pressure plate and the light transmitting plate so that, when the first relay is not supplied with electric power, the pressure plate and the light transmitting plate may only be moved closer together by the biasing means, and, when the first relay is provided with electric power, the pressure plate and the light transmitting plate may only be moved apart from one another by the biasing means;
   a second relay comprising a first, a second, and a third pair of second relay terminals, each of these pairs of terminals being connected to one another when and only when the second relay is provided with electrical power;
   a first sensor which is continuous when and only when a sheet is being supplied from a first direction towards the gap between the pressure plate and the light transmitting plate;
   a second sensor which is continuous when and only when a sheet is in a position to be moved by the transporting means;
   a third relay comprising a pair of third relay terminals, which are connected together when and only when the third relay is provided with electric power;
   said third limit switch controlling a supply of actuating electric power to the transporting means to move the sheet in the direction opposite to said first direction;
   the second sensor controlling a supply of electric power to the third relay;
   the first sensor controlling a supply of electric power to the second relay;
   the second pair of second relay terminals controlling a supply of electric power to the light source;
   the third pair of second relay terminals and the second pair of first limit switch terminals, in series, controlling the operation of the light source;
   a supply of electric power to the biasing means being available either via the second pair of second limit switch terminals, or via the series connection of the first pair of second relay terminals and the pair of third relay terminals;
   and a supply of electric power to the first relay being provided through the series connection of the first pair of second limit switch terminals and the parallel connection of the first pair of first limit switch terminals and the pair of first relay terminals.

9. A device according to claim 8, wherein said light source is a xenon flash tube whose flashing is controlled by a trigger circuit.

10. A method for exposing a sheet assembly superposed one sheet over the other comprising the following steps:
   subjecting a sheet of substantially transparent heat alterable substance and an original sheet with a totally integral image thereon to light radiation while under pressure;
   sequentially advancing successive portions of the sheet assembly which bear different parts of said image but slightly overlap one another between a pressure plate and a light transmitting plate, with the original sheet being closer to the pressure plate;
   sequentially clamping said sequentially advanced successive portions of the slightly overlapped sheet assembly between said pressure plate and said light transmitting plate;
   sequentially irradiating said sequentially advanced successive portions of the slightly overlapped sheet assembly with electromagnetic radiation through the light transmitting plate in the clamped condition.

* * * * *